US007227288B2

(12) United States Patent
Goche

(10) Patent No.: US 7,227,288 B2
(45) Date of Patent: Jun. 5, 2007

(54) APPARATUS AND METHOD FOR INCREASING EFFICIENCY OF ELECTRIC MOTORS

(75) Inventor: Gerald Goche, Dunedin, FL (US)

(73) Assignee: Miraculous Motors Corporation, Dunedin, FL (US)

( * ) Notice: Subject to any disclaimer, the term of this patent is extended or adjusted under 35 U.S.C. 154(b) by 27 days.

(21) Appl. No.: 10/908,934

(22) Filed: Jun. 1, 2005

(65) Prior Publication Data
US 2005/0200224 A1 Sep. 15, 2005

Related U.S. Application Data

(63) Continuation-in-part of application No. 10/602,966, filed on Jun. 24, 2003, now Pat. No. 7,034,426.

(30) Foreign Application Priority Data
Jun. 25, 2002 (FR) ................... 02 07820

(51) Int. Cl.
*H02K 23/02* (2006.01)
*H02K 3/00* (2006.01)
*H02K 11/00* (2006.01)

(52) U.S. Cl. ............ 310/184; 310/68 R; 310/785; 310/795

(58) Field of Classification Search ........ 310/179–180, 310/184–193, 198, 68 R; 318/795, 782–785, 318/775–779, 792, 793
See application file for complete search history.

(56) References Cited

U.S. PATENT DOCUMENTS 2,100,660 A * 11/1937 Greiner ................ 310/35
3,670,238 A * 6/1972 Ronk ................... 363/150
4,107,583 A * 8/1978 Houtman .............. 318/781
4,117,390 A * 9/1978 Iwata et al. ............ 322/90
4,319,168 A * 3/1982 Kemeny ............... 318/135
4,959,573 A * 9/1990 Roberts ............... 310/68 R
5,212,435 A * 5/1993 Dutro ................. 318/785
6,252,324 B1 * 6/2001 Muhr .................. 310/159
7,034,426 B2 * 4/2006 Goche ................. 310/184

FOREIGN PATENT DOCUMENTS

JP       354068906 A * 6/1979 ......... 310/184

* cited by examiner

Primary Examiner—Tran Nguyen
(74) Attorney, Agent, or Firm—Ronald E. Smith; Smith & Hopen P.A.

(57) ABSTRACT

A single or multiphase alternating current electric motor or synchronous generator includes main windings and additional windings that perform de-saturation of the magnetic field of the main windings. Each additional winding is fed through at least one capacitor in a different phase angle and opposite field directions from the respective main windings. The total cross sections of the wire used on each main and additional winding are of predetermined sizes and preferably follow the approximate ratio of approximately two-thirds (⅔) for the main winding and approximately one-third (⅓) for the additional winding, and the respective capacitor values are predetermined. The number of turns of each additional winding is from fifty to one hundred percent (50%-100%) of the number of turns of its respective main winding. The two windings are built simultaneously in a single operation.

13 Claims, 18 Drawing Sheets

APPARATUS AND METHOD FOR INCREASING EFFICIENCY OF ELECTRIC MOTORS

CROSS-REFERENCE TO RELATED DISCLOSURES

This continuation-in-part disclosure claims the benefit of co-pending U.S. patent application Ser. No. 10/602,966, filed Jun. 24, 2003, now U.S. Pat. No. 7,034,426 by the same inventor, which disclosure relates to French Patent Application Number 0207820000 filed Jun. 25, 2002, now French patent No. FR 2841404.

BACKGROUND OF THE INVENTION

1. Field of the Invention

This invention relates to electric motors and synchronous generators. More particularly, it relates to a motor or generator that operates at a very high efficiency over a broad range of loads.

2. Description of the Prior Art

Single phase alternating current electric motors are typically used for low horse power applications. Their range may extend from a fractional horsepower up to about ten horsepower. Three phase motors are typically used when the horsepower requirements exceed ten horsepower.

U.S. Pat. No. 4,446,416A to Wanlass, granted May 1, 1984, entitled "Polyphase Electric Machine Having Controlled Magnetic Flux Density" discloses a stator core having main windings and additional control windings. The flux density is optimized in a polyphase machine by controlling the flux density in the stator core. More particularly, a main polyphase stator winding is wound on a magnetic core and includes a plurality of windings where each winding represents a single phase. Capacitors are connected in series to each of the windings. The capacitors reduce reactive power.

An additional motor winding technique is also disclosed in German patent application No. 2508374 to Wen, published Sep. 9, 1976 and entitled "Single Phase Induction Motor." Wen discloses a single phase motor having two start windings to increase the start capacitor voltage. Wen also discloses a single phase induction motor having two sets of start windings to provide a better running power factor and an improved starting torque.

The Wanlass and the Wen motors, like all motors heretofore known, operate most efficiently at full load and are less efficient in low load conditions. Thus, a conventional motor might have a power factor greater than 0.90 during full load conditions and a power factor of 0.50 or less at low load.

A power company experiences the exact reverse percentage proportion of the power factor to supply energy to any electric motor. A motor running at 0.70 power factor uses thirty percent (30%) more amperage than one running at unity power factor (0.999 or 1.00). A generator supplying power will be overloaded by the supplement of amp demand and will simultaneously transfer that to the driver (diesel or turbine), that will need that much more energy to produce for the new demand. The new demand in kilowatts is Identical to the original demand. The only change is in the power factor. Accordingly, use of motors that cannot perform at a high power factor at all loads is contraindicated.

A motor that operates at a high power factor over all loads is therefore needed. However, the conventional wisdom has been for many decades that motors will always operate at reduced efficiency when the loads applied thereto are reduced because such lower efficiency at low loads is an inherent feature of motors. Power factors in the range of 0.90 and greater at low load conditions have been considered to be impossible to attain.

Any producer of electricity is penalized in its production when it supplies costumers that use poor power factor (P/F) standard motors. The penalty is even greater if such motors are often used at low duty cycle (from no load to seventy-five percent (75%) load) or if such motors are fed through V.F.D (Variable Frequency Drive). When a motor is reduced in speed by reducing the frequency it automatically drops in power factor.

For example: A motor (A) that pulls thirty (30) amps at four hundred sixty (460) volts at 0.88 power factor will consume 21.03 KW. (30 amps×460 volts×1.732×0.88 P/F).

Another motor (B) of the same H.P. running at an average P/F of 0.68, will also consume 21.03 KW. The amperage increases to 38.83 amps (38.83 amps×460 volts×1.732×0.68 P/F)

The KW consumed by motor (A) is identical to the KW consumed by motor (B). This means that to supply motor (B), a power company will have to produce 29.4% more amperage out of their generator than to supply motor (A). The generator that produces the electricity is typically driven by a diesel engine or a steam turbine. Current is the factor that loads and unloads generators, so the direct consequence of the above comparison of motors is that it will cost 29.4% more energy (diesel fuel, coal, and the like) to produce the same 21.03 KW for motor (B) than for motor (A).

It could be concluded that the owner of motor (B) should pay more for its 21.03 KW than the owner of motor (A). Alternatively, the owner of motor (B) should be required to convert said low power factor motor to a high power factor motor.

What is needed, then, is an improvement in motors that increases the power factor of a motor so that less energy is required to perform a given task vis a vis the energy required by conventional, low power factor motors. For example, if the power factor could be increased to 0.98, the current would drop to 26.93 amps. Multiplying that amperage by 460 volts and 1.732 and 0.98 P/F yields 21.03 KW. Note that the current drawn is 38.83 amps with a P/F of 0.68, 30.0 amps with a P/F of 0.88, and 26.93 amps with a P/F of 0.98.

However, in view of the prior art considered as a whole at the time the present invention was made, it was not obvious to those of ordinary skill in the art of motors how to substantially increase the power factor of motors.

SUMMARY OF THE INVENTION

The present invention includes a pioneering method for improving the efficiency of an alternating current electric motor across its full range of operation, i.e., from no load to full load. The highly novel steps includes the steps of selecting a first wire size for a first conductor and a second wire size for a second conductor so that the first wire size is greater than the second wire size. The first conductor is wound to form a main winding and the second conductor is wound to form an additional winding. The number of turns of the additional winding is at least equal to half the number of turns of the main winding and may equal but does not exceed the number of turns of the main winding. A capacitor is electrically connected in series with the additional winding. The additional winding and capacitor are then electrically connected in parallel relation to the first winding. The additional winding is connected in reverse relation relative to the main winding so that current in the first winding flows in a first direction and current in the additional winding flows in a second direction opposite to the first direction.

The main winding and the additional winding and capacitor are provided for each phase of a single or multiphase electric motor.

In a three phase motor, three of the main windings and three of the additional windings and capacitors connected in a delta or star (also known as a "Y" or "Wye" configuration).

To determine the value of the capacitance, in microfarads, for the capacitor in series with the additional winding, the current drawn by the alternating current electric motor at full load is determined, as is the line voltage supplied thereto. The value in microfarads is obtained by multiplying the current drawn by the alternating current electric motor at full load by an empirical factor (a constant) to obtain a result and dividing the result by the square of the line voltage.

The empirical factor falls in a range from about $0.25 \times 10^6$ to about $0.30 \times 10^6$.

The first and second wire sizes are selected so that the cross-sectional area of the first wire size is greater than the cross-sectional area of the second wire size by a ratio of about two-thirds (⅔) to one-third (⅓).

The step of winding the first conductor to form the main winding is preferably performed simultaneously with the step of winding the second conductor to form the additional winding. Such winding of the additional winding is performed for at least part of the time during which the step of winding the first conductor is performed.

The alternating current electric machine of this invention operates at very high efficiency over all load conditions. As used herein, the term "alternating current electric machine" includes an alternating current electric motor of the single phase or multiphase type having at least three phases. That term also includes a synchronous generator with at least two poles. For convenience, the following disclosure refers to electric motors but it should be understood that the broader term "electric machine" as defined herein may be substituted for each reference to a motor.

The novel electric motor of this invention includes main windings just like a conventional motor. However, it differs in that an additional winding that performs a de-saturation function is also provided. Each additional winding is electrically connected in series with a capacitor. Each additional winding and capacitor are electrically connected in parallel to the main winding. Significantly, the additional winding is reversely connected relative to its associated main winding so that the direction of current flow through the main winding is opposite to the direction of current flow through the additional winding. Moreover, the current flowing through the main winding is out of phase with the opposed current flowing through the additional winding. The proper size capacitor allows the precise phase shift required for the inventive method to perform.

The total cross sectional area of the wire used on each main and additional winding is allocated to the respective windings in accordance with a distinctive ratio. Specifically, where the total cross sectional area is defined as unity, then the main winding has a cross sectional area of approximately two-thirds (⅔) of unity and the additional winding has a cross sectional area of about one-third (⅓) of unity.

The invention further includes a novel winding method for the alternating current electric motor. Specifically, the two windings of the electric motor are preferably built at one time in one operation, as a single step.

The present invention also includes a method for calculating the value, in microfarads, of the capacitor in series with the additional winding. The capacitor value in microfarads is directly proportional to the actual full load current and is inversely proportional to the square of the line voltage. The numerator is multiplied by a constant or multiplying factor having a range between $0.25 \times 10^6$ and $0.3 \times 10^6$.

A single phase electric motor, according to the present invention, includes first and second main windings electrically connected to a main common point and first and second main potential lines of a line voltage. It further includes first and second additional windings electrically connected to a winding capacitor and the first and second potential lines in parallel with the first and second main windings. The first and the second additional windings generate magnetic fields in opposite directions to their associated first and second main windings, respectively.

A start winding is electrically connected between a preselected line of the first and second potential lines and a start capacitor. A switch is electrically connected between the start capacitor and a preselected line of the first and second potential lines.

Each first and second main winding has a main wire cross-sectional area that is about twice the cross-sectional area of its associated first and second additional winding. This two-thirds to one-third (⅔-⅓) ratio applies to single phase as well as multiphase windings.

The invention also has other aspects that not only improves the power factor of a motor but which also reduces kilowatt consumption.

BRIEF DESCRIPTION OF THE DRAWINGS

For a fuller understanding of the nature and objects of the invention, reference is made to the accompanying drawings in which.

DESCRIPTION OF THE PREFERRED EMBODIMENT

Figure 1:
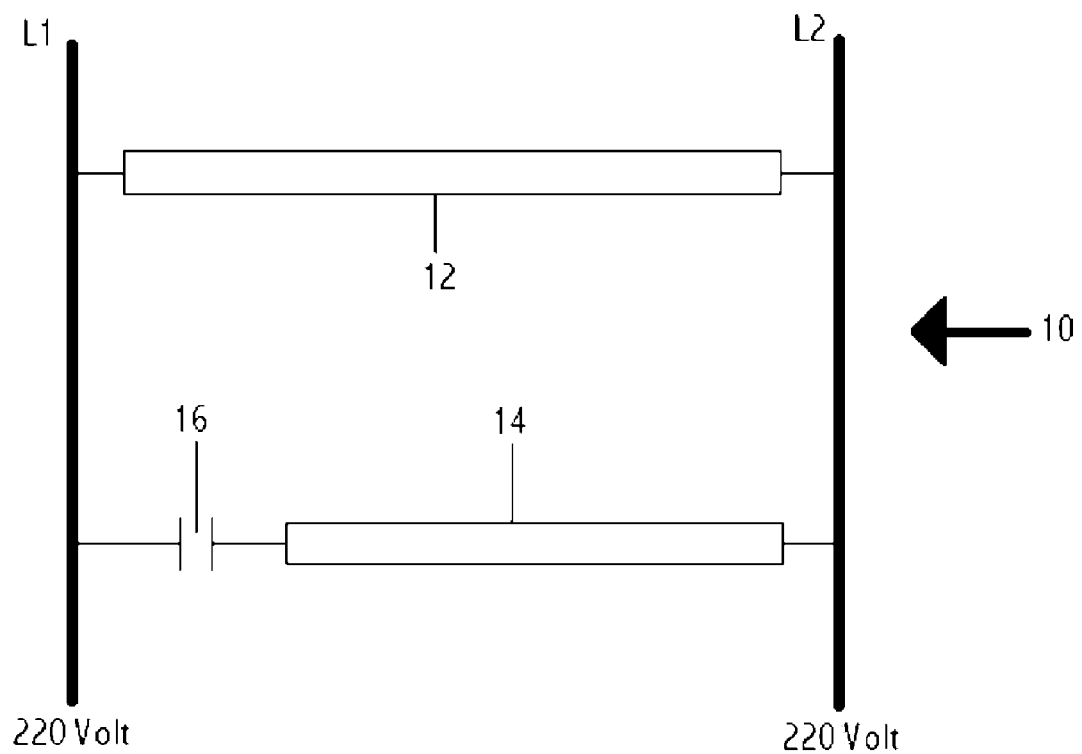
FIG. 1 is a diagrammatic representation of a prior art single phase electric motor.

Referring now to FIG. 1, it will there be seen that a prior art single phase motor is diagrammatically depicted and denoted by the reference numeral 10 as a whole.

Single phase motor 10 includes a run winding 12, a start winding 14, and a run capacitor 16. Capacitor 16 de-phases the start winding immediately after the start sequence, when running speed is attained. It does not improve the power factor of motor 10. Current flowing through winding 14 flows in relation with winding 12 to determine the rotation direction needed by the motor application.

Single phase electric motors commonly include a start capacitor in series with a centrifugal switch or a disconnecting relay that forms a part of the start winding circuit. An accurate calculation of the run capacitor sizes in microfarads optimizes the efficiency of the electric motor, thereby enhancing starting torque, starting and running current, and temperatures.

Figure 2:
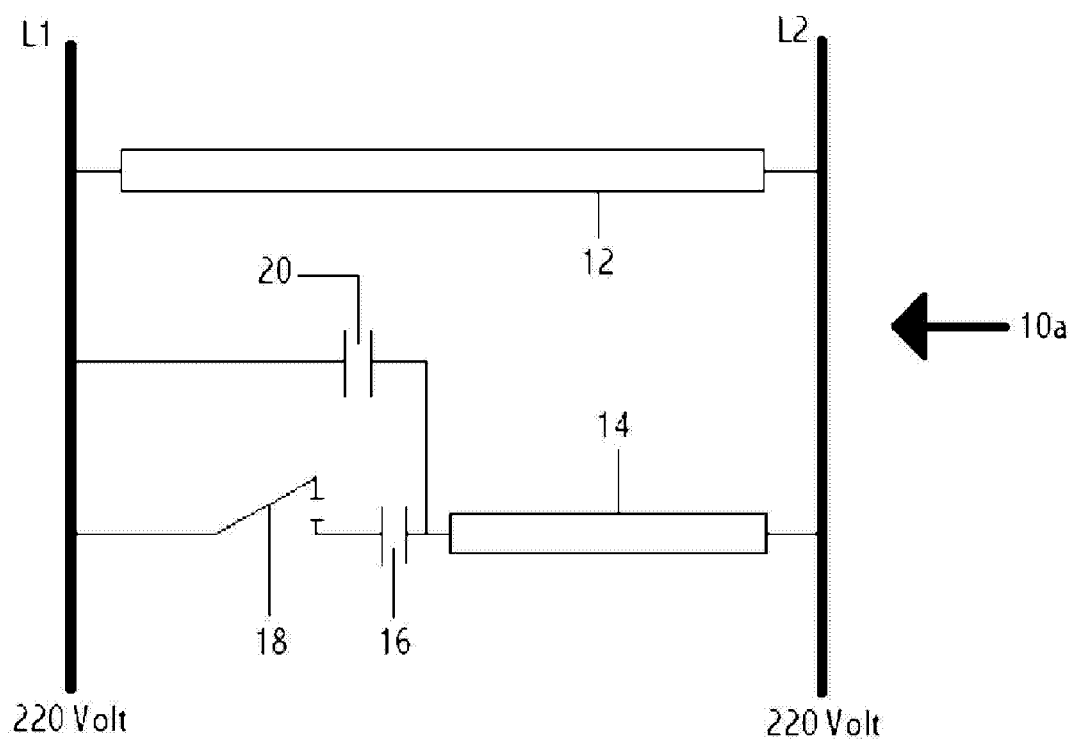
FIG. 2 is a diagrammatic representation of an improved prior art single phase electric motor.

For example, FIG. 2 diagrammatically depicts such improved single phase electric motor, denoted 10a as a whole. Motor 10a includes run winding 12, start winding 14, start capacitor 16, centrifugal switch or disconnecting relay 18, and run capacitor 20.

Figure 3:
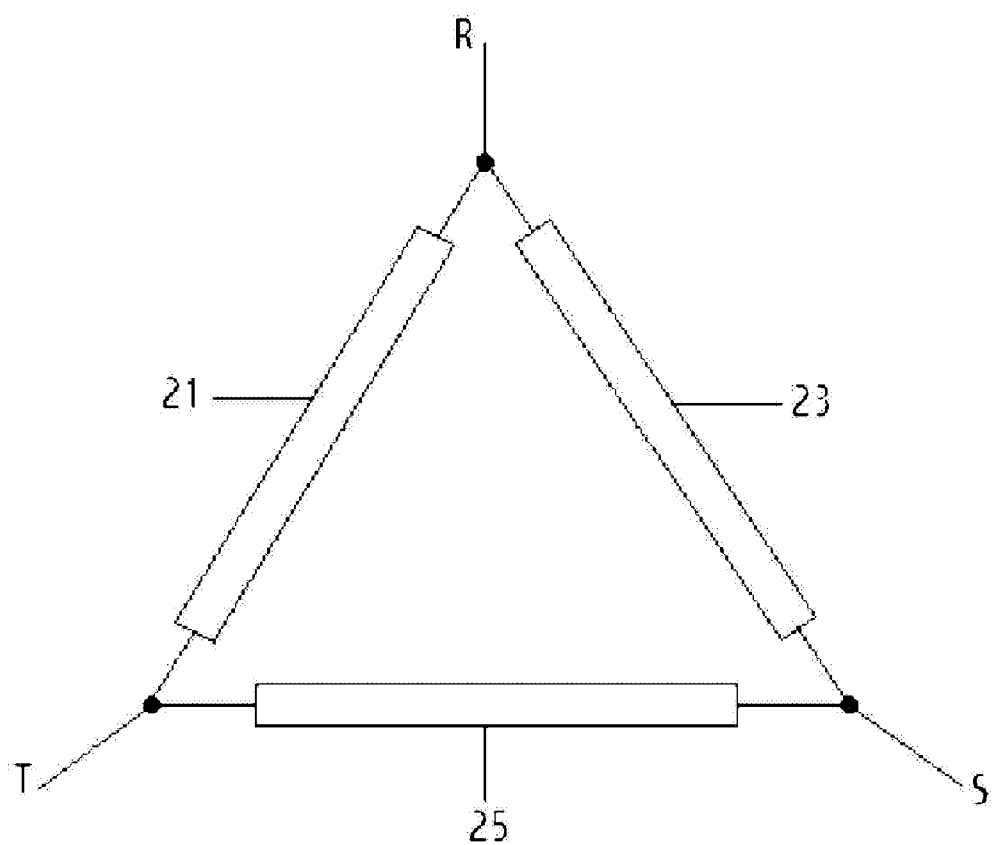
FIG. 3 is a diagrammatic representation of a prior art three phase delta configuration motor.

FIG. 3 is a diagrammatic representation of a prior art three phase motor having main windings 21, 23, and 25 arranged in a delta configuration. The respective Incoming line voltages of the three phases are denoted R, S, and T.

Figure 4:
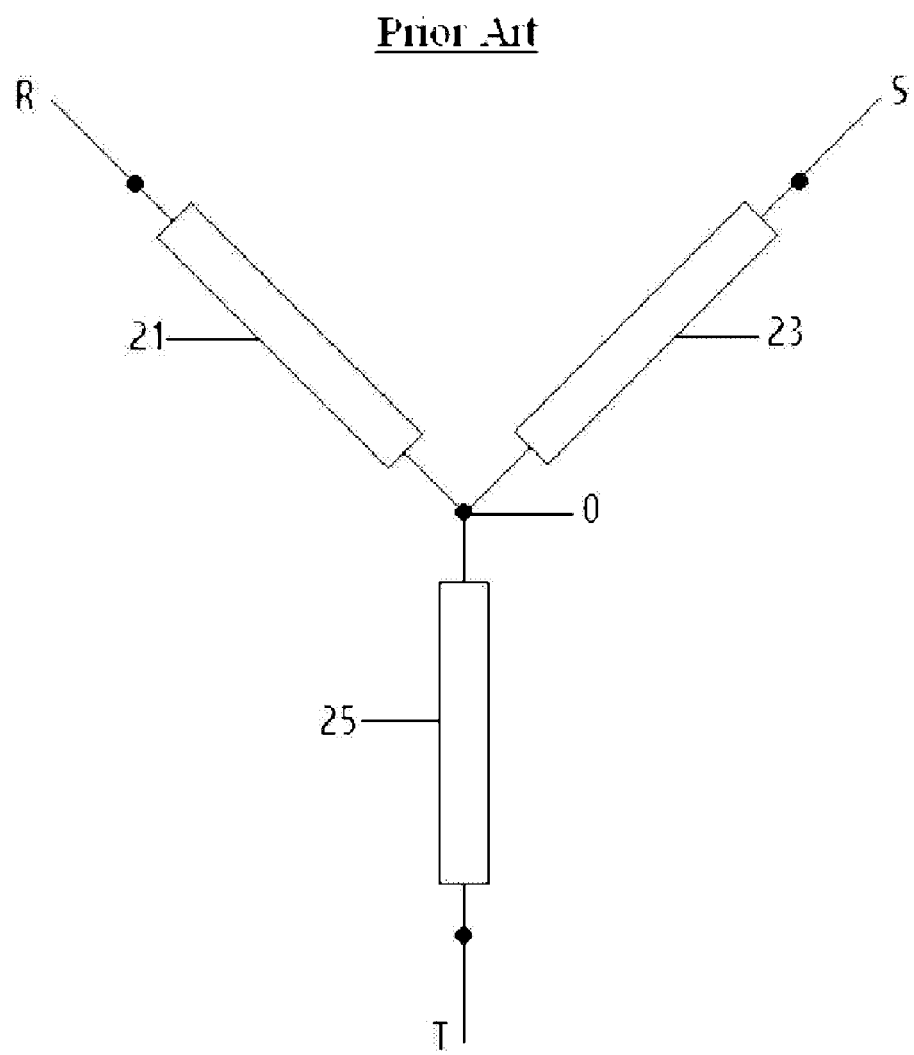
FIG. 4 is a diagrammatic representation of a prior art three phase star configuration electric motor.

FIG. 4 is a diagrammatic representation of a prior art three phase motor having main windings 21, 23, and 25 arranged in a star configuration. The respective Incoming line voltages of the three phases are denoted R, S, and T. The center point of the star connection is denoted 0.

In the three phase electric motors of the prior art, the number of poles is determined by the speed requirements of a particular application. The star or delta configuration is internally connected to deliver the torque, horsepower and voltage required by a particular application.

Figure 5:
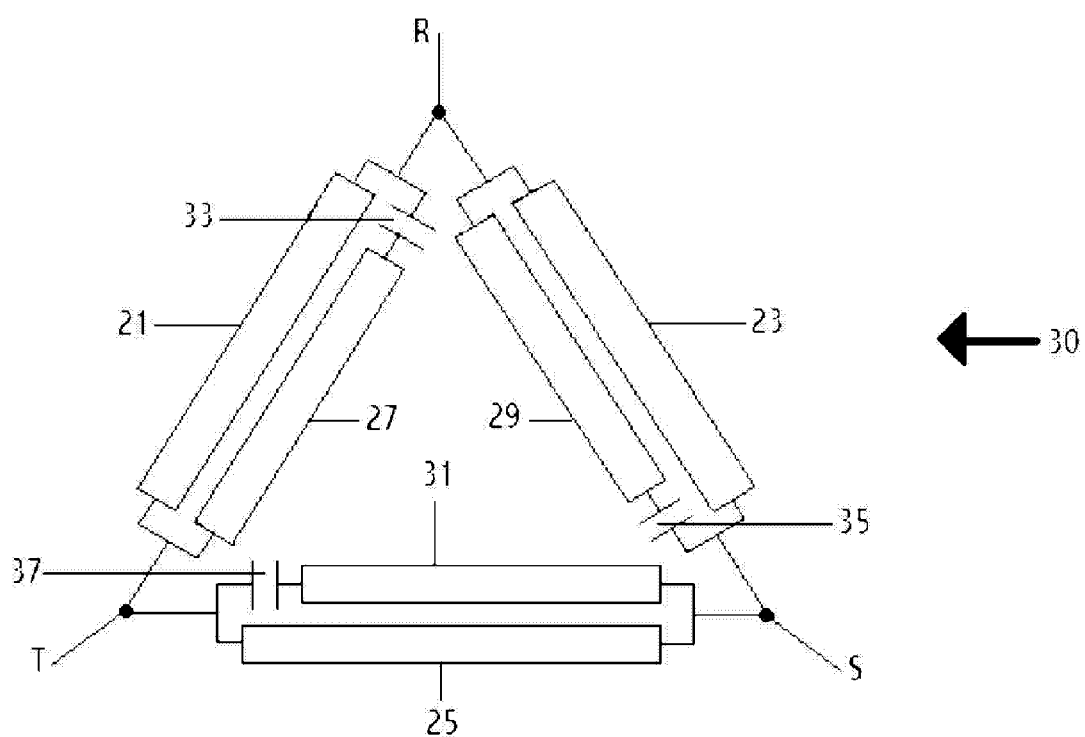
FIG. 5 is a diagrammatic representation of a delta configuration electric motor of the prior art.

FIG. 5 depicts an improved three phase delta configuration electric motor 30 of the prior art. The three main windings are denoted 21, 23, and 25, and the three additional windings are denoted 27, 29, and 31. The additional winding capacitors are denoted 33, 35, and 37, and the three phase line voltage connections are denoted R, S, and T.

Additional winding 27 is in series with capacitor 33 and said additional winding 27 and capacitor 33 are connected in electrically parallel relation to main winding 21. Additional winding 27 is connected in the same direction as main winding 21. Accordingly, current flows through main winding 21 and additional winding 27 in the same direction. Capacitor 33 changes the phase of the current flowing through the additional winding so that said current is out of phase with the current flowing through main winding 21. This reduces the reactive power of the motor and improves the motor's power factor at rated full load only.

Windings 27, 29, and 31 have the same amount of turns as windings 21, 23 and 25.

Additional winding 29 is in series with capacitor 35 and said additional winding 29 and capacitor 35 are connected in electrically parallel relation to main winding 23. Additional winding 29 is connected in the same direction as main winding 23. Accordingly, current flows through main winding 23 and additional winding 29 in the same direction. Capacitor 35 changes the phase of the current flowing through the additional winding so that said current is out of phase with the current flowing through main winding 23. This reduces the reactive power of the motor and improves the motor's power factor at rated full load only.

Additional winding 31 is in series with capacitor 37 and said additional winding 31 and capacitor 37 are connected in electrically parallel relation to main winding 25. Additional winding 31 is connected in the same direction as main winding 25. Accordingly, current flows through main winding 25 and additional winding 31 in the same direction. Capacitor 37 changes the phase of the current flowing through the additional winding so that said current is out of phase with the current flowing through main winding 25. This reduces the reactive power of the motor and improves the motor's power factor at rated full load only.

Figure 6:
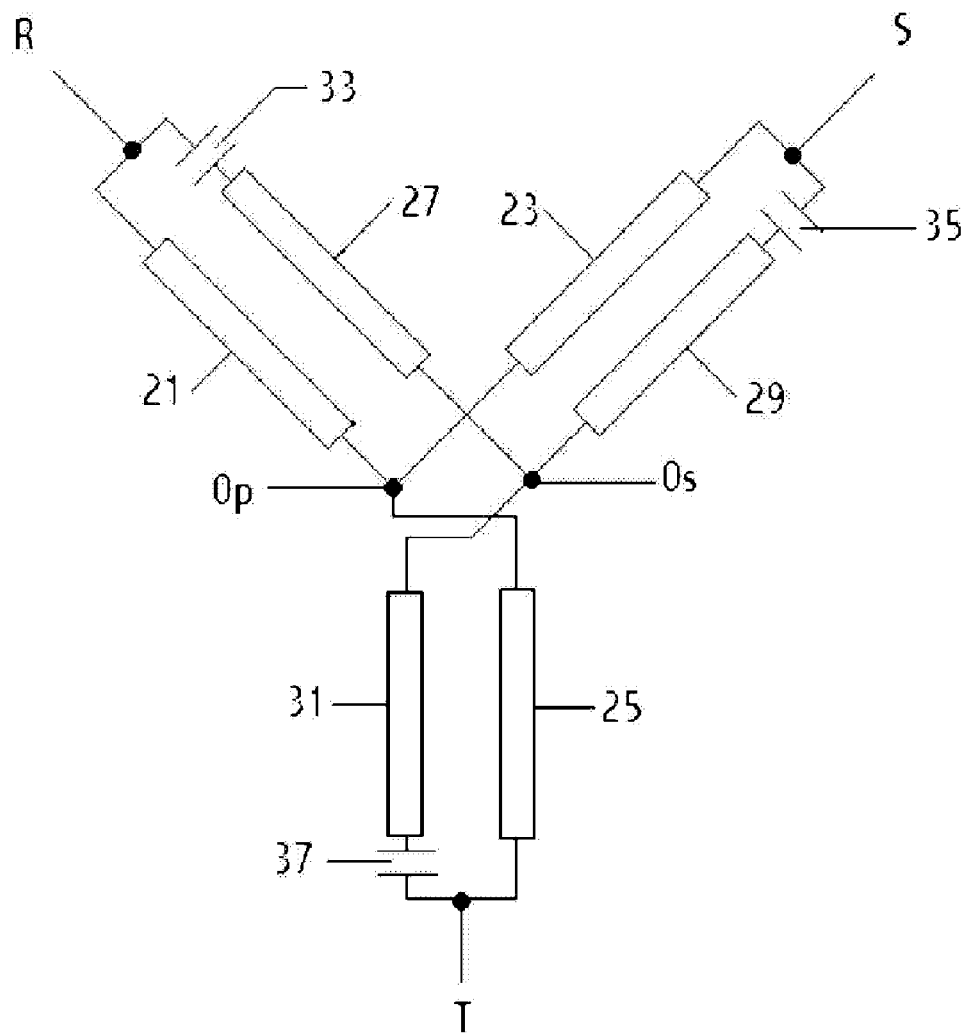
FIG. 6 is a diagrammatic representation of a star configuration electric motor of the prior art.

FIG. 6 depicts a three phase star configuration electric motor of the prior art. The three main windings are denoted 21, 23, 25, and the three additional windings are denoted 27, 29, and 31. The additional winding capacitors are denoted 33, 35, and 37 and the three phases line voltage connections are denoted R, S, and T. The center point of the star for the main winding is denoted OP and the center point of the star for the additional winding is denoted OS. As in the delta configuration of FIG. 5, each additional winding is in electrical series with a capacitor associated with it and each series-connected additional winding and capacitor is in electrically parallel relation to its associated main winding. The additional windings are connected in the same direction as their associated main windings. Each additional winding has the same amount of turns as its associated main winding.

Figure 7:
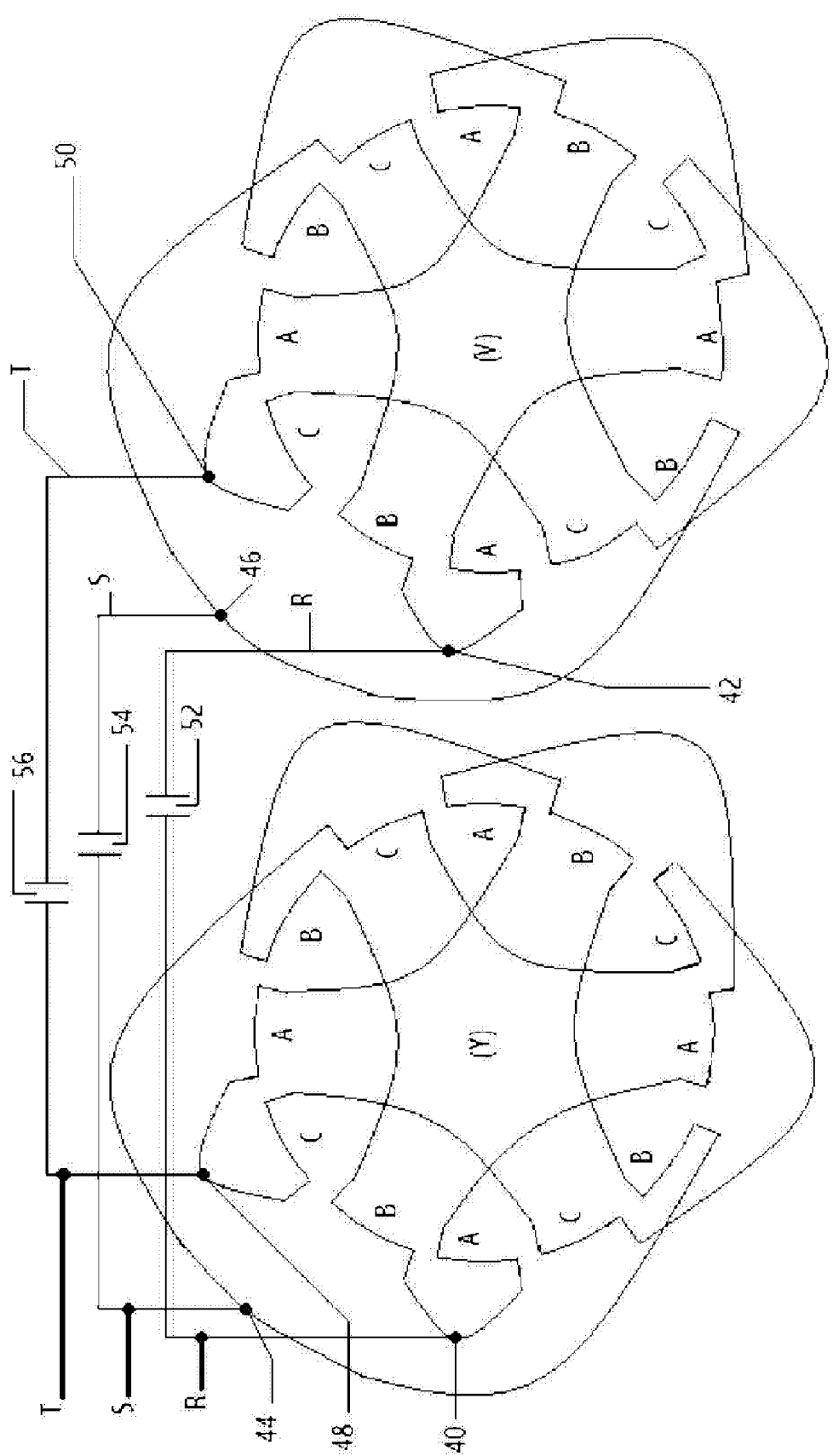
FIG. 7 is a representation of a winding interval connection for a prior art electric motor having four poles.

FIG. 7 is a winding diagram for a prior art electric motor. It depicts winding interval connections and shows four poles, each of which is denoted among each phase A, B, and C (four (4) poles for phase A, four (4) poles for phase B, and four (4) poles for phase C in main winding Y as well as in additional winding V) The connection point for in line R is denoted 40 for the main winding Y and 42 for the additional winding V. In line S is denoted 44 for main winding Y and 46 for additional winding V. In line T is denoted 48 for main winding Y and 50 for additional winding V. The additional winding capacitors are denoted 52, 54, and 56. Note that this winding is a physically unbalanced pattern. Delta connection 44 is uneven in relation to delta connections 40 and 48.

Moreover, delta connection 46 is uneven in relation to delta connections 42 and 50. This physical unbalance affects phase angle slip between the two windings in relation to the rotation direction (clockwise or counterclockwise) of the rotor. This type of winding internal connection affects energy savings in one rotation direction.

Applying the technology of FIGS. 5, 6 and 7 to a conventional three phase electric motor achieves an increase of overall copper density by about fifteen percent (15%) and separation of the conventional winding into two separate windings following the ratio of one-half (½).

To convert a standard motor to the technology of FIGS. 5, 6, and 7 requires the following:

Increase overall copper density by about fifteen percent (15%)

Separate the conventional winding into two (2) separate windings following the ratio of ½.

Convert the original winding layout in lap wound adjacent poles.

(Consequent poles type design cannot by used)

Convert the original type connections into a delta configuration respecting the same amount of overall circuits. (This technology presents a star configuration option, but field tests have shown no efficiency nor consumption improvements).

Calculate the additional winding capacitance value as follows:

$$C = P \times \frac{(460)^2}{(E)^2} \times 1.5$$

where

C is the capacitor value in microfarads per phase;

P is the electric motor theoretical rated horsepower;

1.5 is a multiplying factor derived from the research experiments; and 460 is a constant base voltage.

This formula does not accurately calculate the optimum capacitor value because it does not take into consideration the actual field working under load parameters of the motor. These types of electric motors run at a better power factor and therefore save some energy. However, they are low in quality and have a relatively short working lifetime.

Figure 8A:
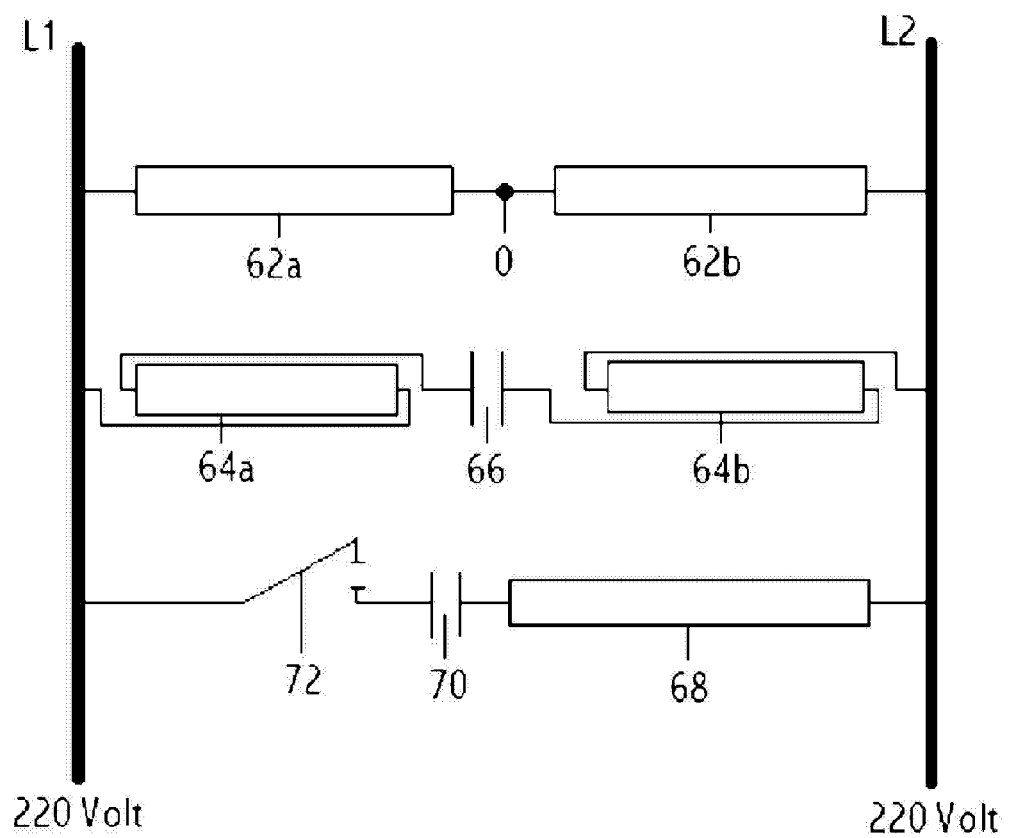
FIG. 8 is a diagrammatic representation of a single phase electric motor that incorporates the teachings of this invention.

FIGS. 8A. 8B, 8C, and 8D depict a single phase electric motor that incorporates the teachings of the present invention.

In FIG. 8A, the main winding is depicted in two half sections, respectively denoted 62a and 62b, and separated by middle point 0. The center point of the main winding is used for dual voltage purposes, thus allowing a series or parallel connection option if needed by voltage change or output horsepower change like in any standard motor.

Similarly, the additional winding also includes two half sections denoted 64a and 64b, in series with capacitor 66. A start winding is denoted 68, a start capacitor is denoted 70, and a centrifugal switch or disconnecting relay is denoted 72. Significantly, additional windings 64a, 64b are reversely connected in parallel relation to their respective main windings 62a, 62b.

Figure 8B:
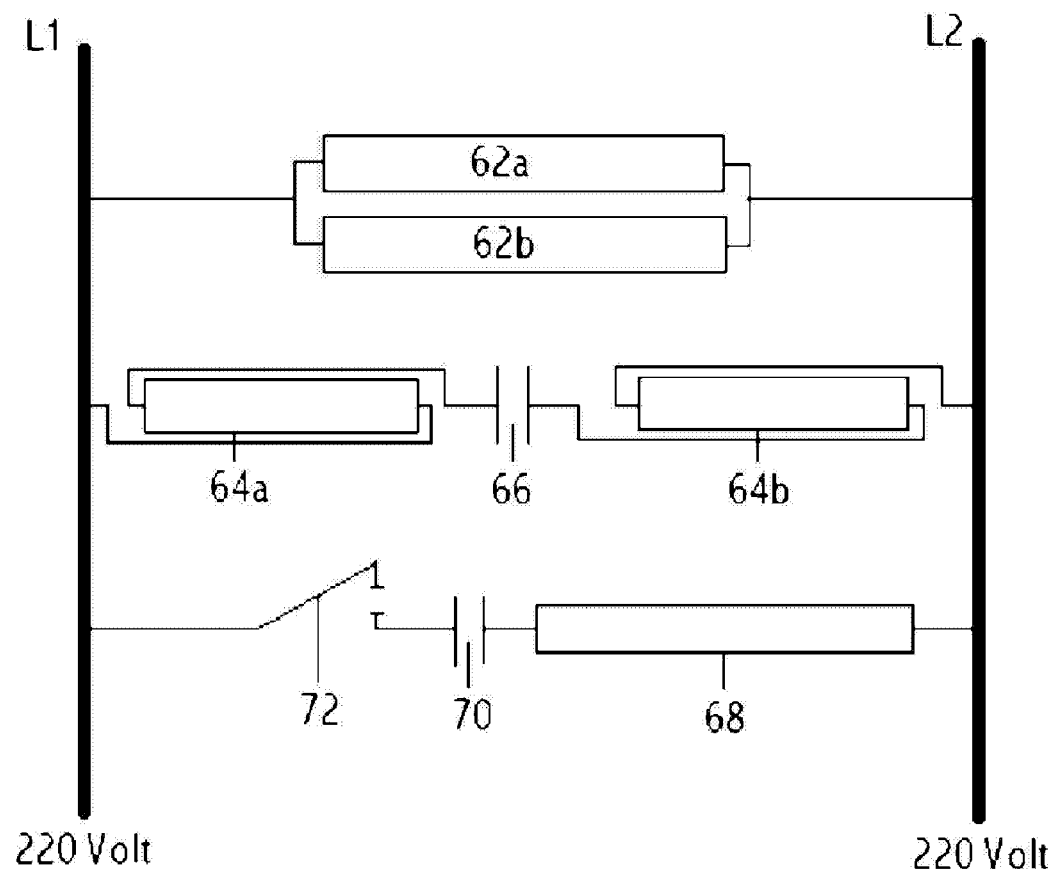

In FIG. 8B, the main winding is depicted in two half sections, respectively denoted 62a and 62b, that are connected in electrically parallel relation to one another. In all other respects, the circuit of FIG. 8B is the same as the circuit of FIG. 8A.

Figure 8C:
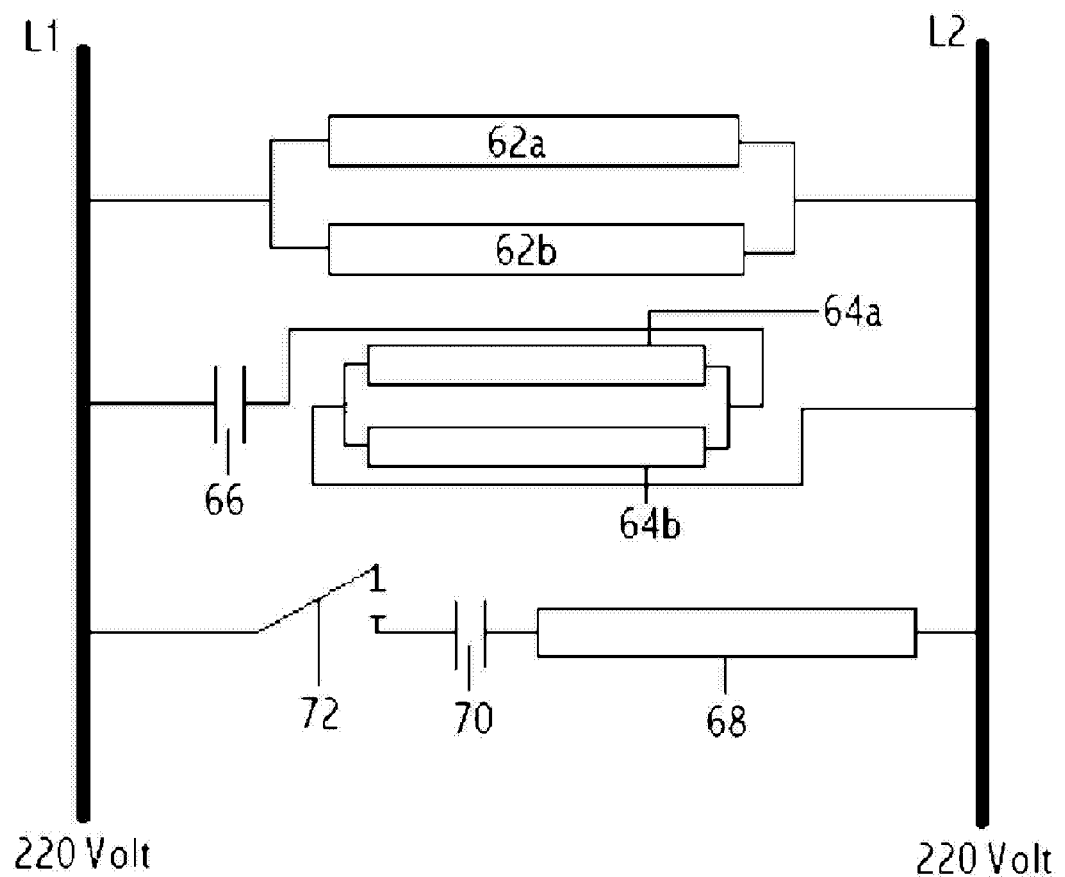

In FIG. 8C, additional windings 64a, 64b are connected in electrically parallel relation to one another, in series with capacitor 66. In all other respects, the circuit of FIG. 8C is the same as the circuit of FIG. 8B.

Figure 8D:
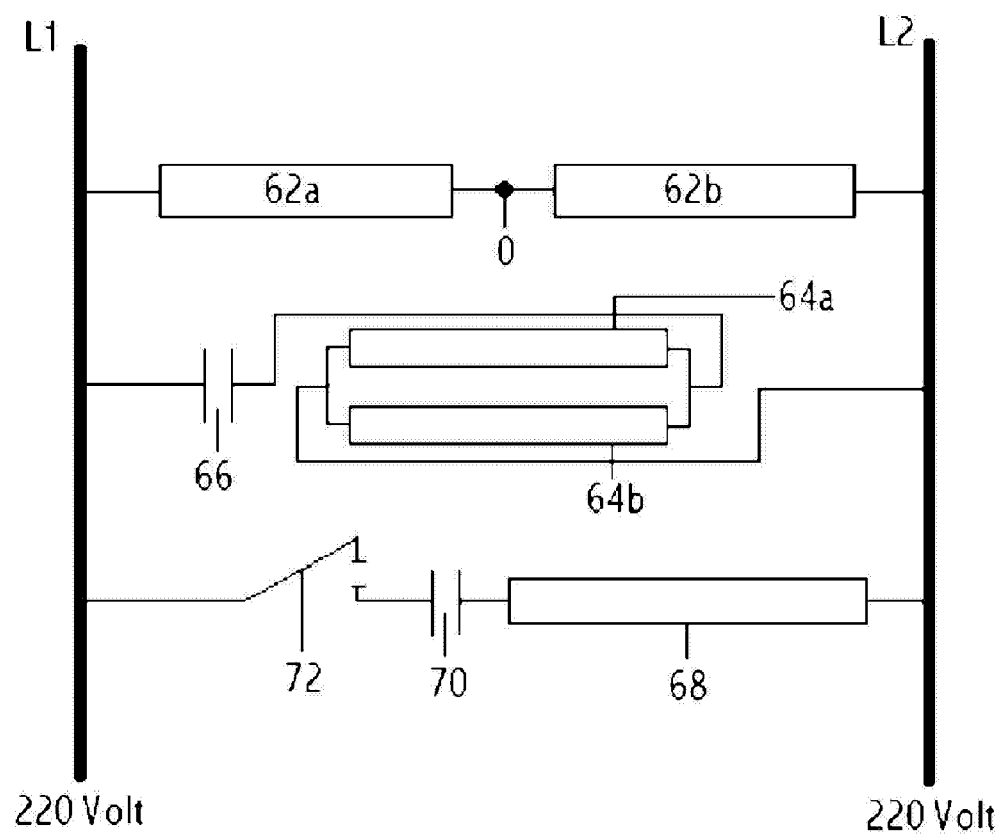

In FIG. 8D, additional windings 64a, 64b are connected in electrically parallel relation to one another, in series with capacitor 66. In all other respects, the circuit of FIG. 8D is the same as the circuit of FIG. 8A.

Figure 9:
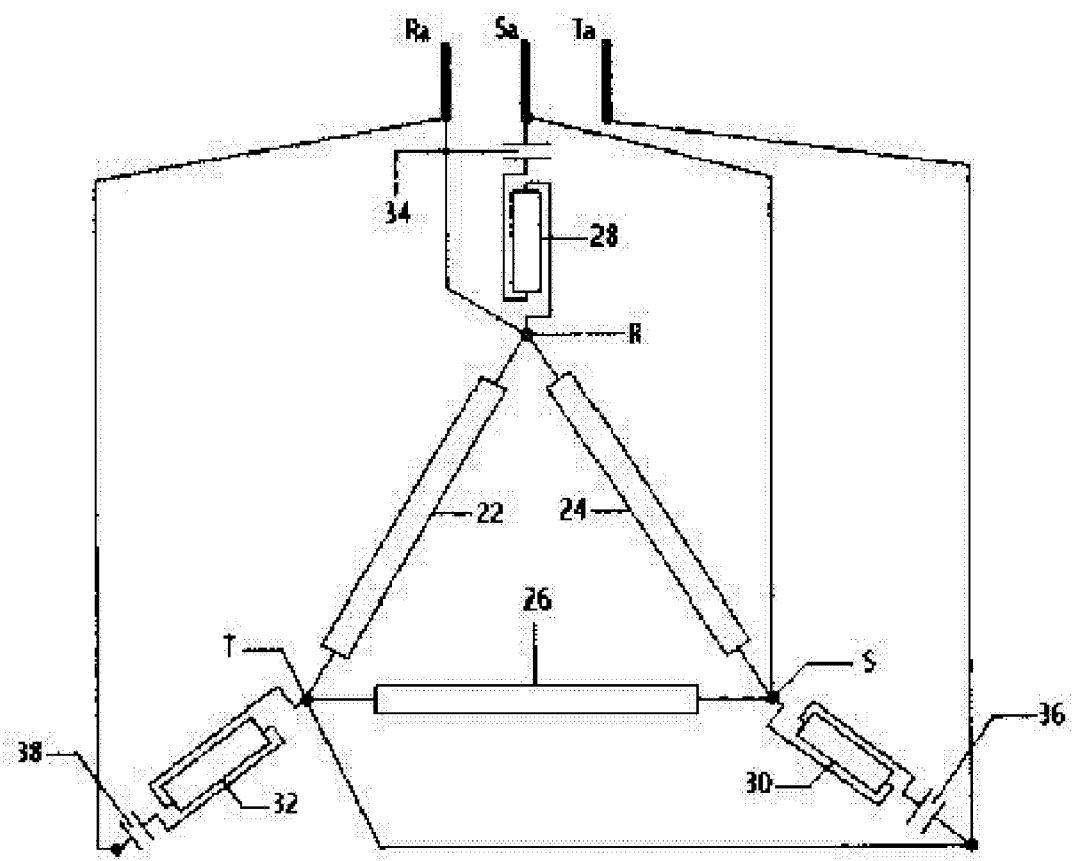
FIG. 9 is a diagrammatic representation of a delta configuration three phase electric motor that incorporates the teachings of this invention.

FIG. 9 diagrammatically depicts a delta-wound three phase electric motor that incorporates the teachings of this invention. The main windings are denoted 22, 24, and 26 and are delta-connected. The additional windings are denoted 28, 30, and 32, and the additional winding capacitors are denoted 34, 36, and 38. The additional windings and the respective additional winding capacitors are electrically also connected in a delta configuration. The delta connection points of the three main windings are denoted R, S, and T. The incoming line voltage connection points are denoted Ra, Sa, and Ta. Each additional winding is fed from a different phase than its respective main winding, thereby putting it into an opposite field situation. Each additional winding also has a predetermined capacitor value that creates the precise phase shift according to the inventive method.

Additional winding 28 is in series with capacitor 34 and said winding and capacitor 34 are connected in electrically parallel relation to main winding 24. Additional winding 28 is reversely connected with respect to main winding 24. Accordingly, current flowing through main winding 24 is in a first direction and current flowing through additional winding 28 is flowing in a second direction opposite to said first direction.

Additional winding 30 is in series with capacitor 36 and said additional winding 30 and capacitor 36 are connected in electrically parallel relation to main winding 26. Additional winding 30 is reversely connected with respect to main winding 26. Accordingly, current flowing through main winding 26 is in a first direction and current flowing through additional winding 30 is flowing in a second direction opposite to said first direction.

Additional winding 32 is in series with capacitor 38 and said additional winding 32 and capacitor 38 are connected in electrically parallel relation to main winding 22. Additional winding 32 is reversely connected with respect to main winding 22. Accordingly, current flowing through main winding 22 is in a first direction and current flowing through additional winding 32 is flowing in a second direction opposite to said first direction.

Additional windings 28, 30, and 32 have a smaller number of turns than their respective main windings 22, 24, and 26. However, improvements in motor operation may be observed even if the additional windings have as many turns as their respective main windings. However, if the number of turns of the additional windings exceeds the number of turns of the main windings, then efficiency is substantially reduced. Moreover, if the number of turns of the additional windings is less than half the number of turns of their associated main windings, then efficiency is again substantially reduced. It may therefore be concluded that the number of turns of each additional winding should be between fifty percent to one hundred percent (50%-100%) of the number of turns of their associated main windings. The actual ratio depends upon the application; moreover, the number of turns can be changed by increasing or decreasing the number of circuits in the additional winding, further shown in FIGS. 13 and 14.

Figure 10:
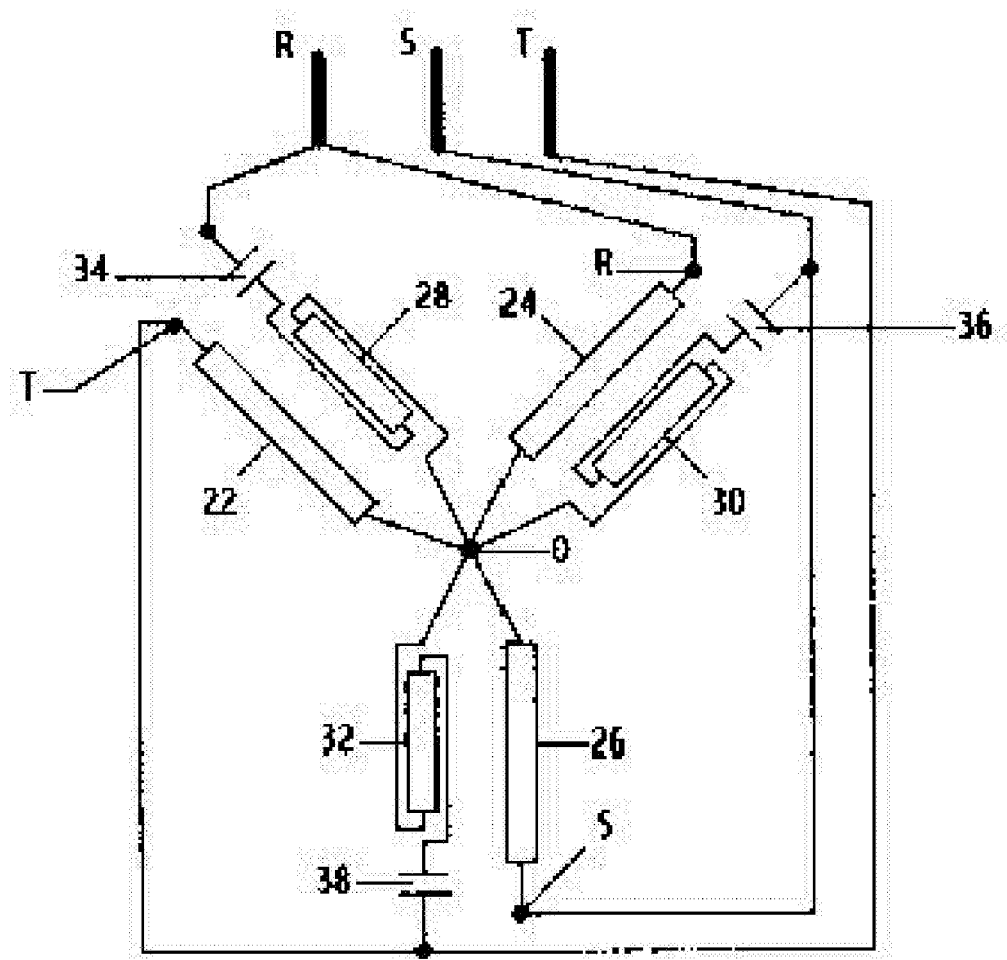
FIG. 10 is a diagrammatic representation of a star configuration three phase electric motor that incorporates the teachings of this invention.

FIG. 10 diagrammatically depicts a star-wound three phase electric motor that incorporates the teachings of the present invention. The three main windings are denoted 22, 24, and 26 and are wound in a star configuration. The three additional windings are denoted 28, 30, and 32 and are wound in a star configuration. The additional winding capacitors are denoted 34, 36, and 38. The star connection point is denoted O and the three line voltage connections are denoted R, S, and T.

As in the delta configuration of FIG. 9, each additional winding is in electrical series with a capacitor associated with it and each series-connected additional winding and capacitor is in electrically parallel relation to its associated main winding. The additional windings are reversely connected relative to their associated main windings and the number of turns of each additional winding is at least equal to half the number of turns of the main winding but is no more than the total number of turns of said main winding.

More particularly, each additional winding is fed with a different phase than its respective main winding. Additional winding 28, electrically parallel connected to main winding 24, physically nested with winding 22 and reversely connected with respect thereto, is connected through capacitor 34 to in line R of main winding 24. Additional winding 30, electrically parallel connected to main winding 26, physically nested with winding 24 and reversely connected with respect thereto, is connected through capacitor 36 to in line S of main winding 26. Additional winding 32, electrically parallel connected to main winding 22, physically nested with winding 26 and reversely connected with respect thereto, is connected through capacitor 38 to in line T of main winding 22. This clearly shows the opposite field position of the additional winding.

Figure 11:
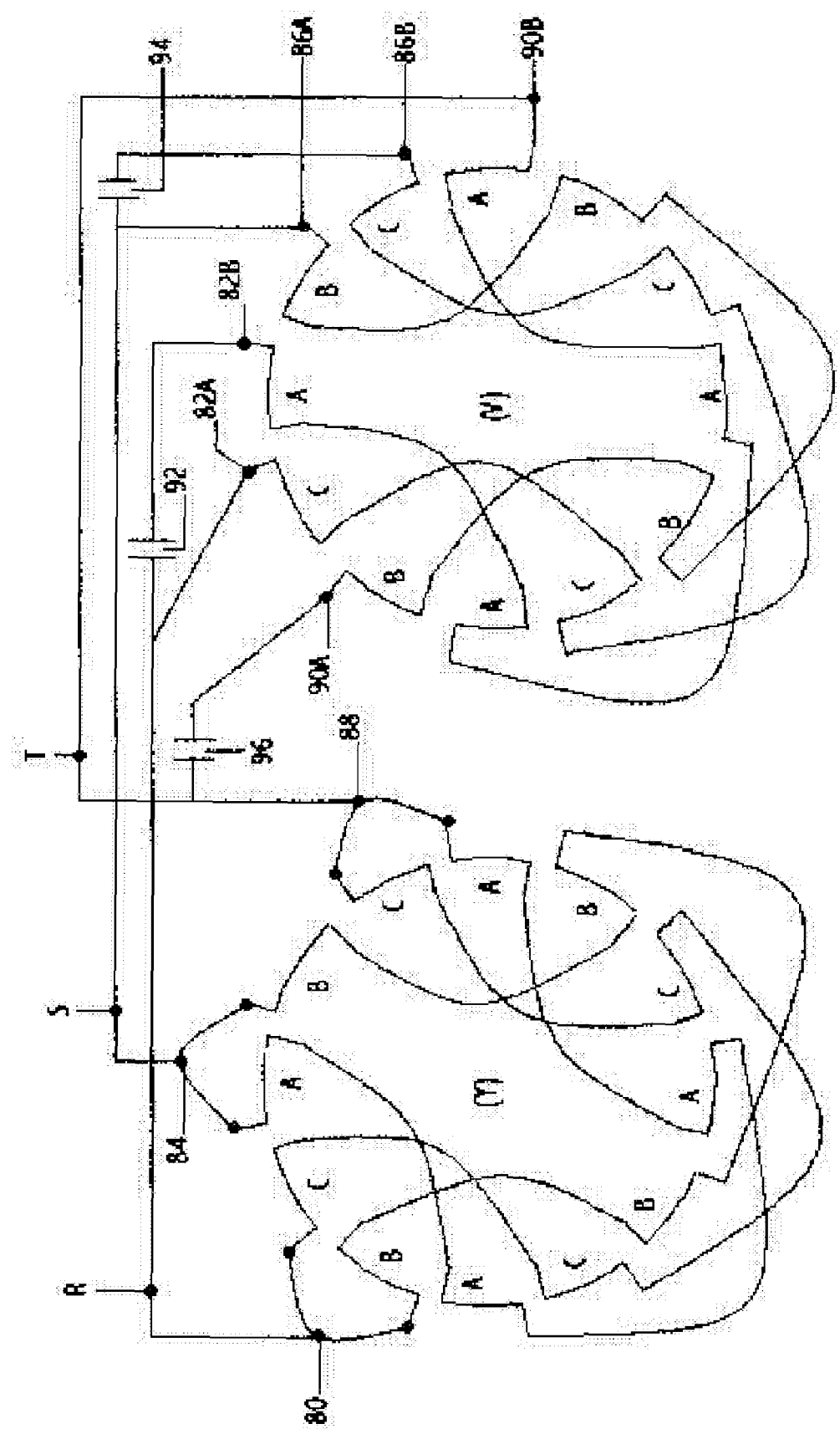
FIG. 11 is a representation of a winding interval connection of a four poles on delta adjacent poles, three phase electric motor that incorporates the teachings of this invention.

FIG. 11 illustrates winding internal connections of a three phase electric motor having four poles, each denoted among each phase A, B and C (four (4) poles for phase A, four (4) poles for phase B and four (4) poles for phase C in main winding Y as well as in additional winding V), one delta adjacent poles, according to the present invention. The connection point for in line R is denoted 80 for main winding Y and 82a, 82b for additional winding V. The connection point for in line S is denoted 84 for main winding Y and 86a, 86b for additional winding V. Connection point 88 of main winding Y is for in line T, and connector points 90a, 90b are for additional winding V. The additional winding capacitors are respectively denoted 92, 94, and 96.

In other words, the respective delta connections of each main and additional winding are the three delta points denoted 80, 84, and 88 of the main winding and 82a, 82b, 86a, 86b, and 90a, 90b of the additional winding. The connections are perfectly symmetrical and equidistant from each other in main winding Y. This novel configuration corrects the efficiency and energy saving problem in relation to the direction of rotation. This illustration depicts a four poles one circuit delta, which corrects the rotational problem at other speeds and multiple numbers of circuits, in delta configurations.

Figure 12:
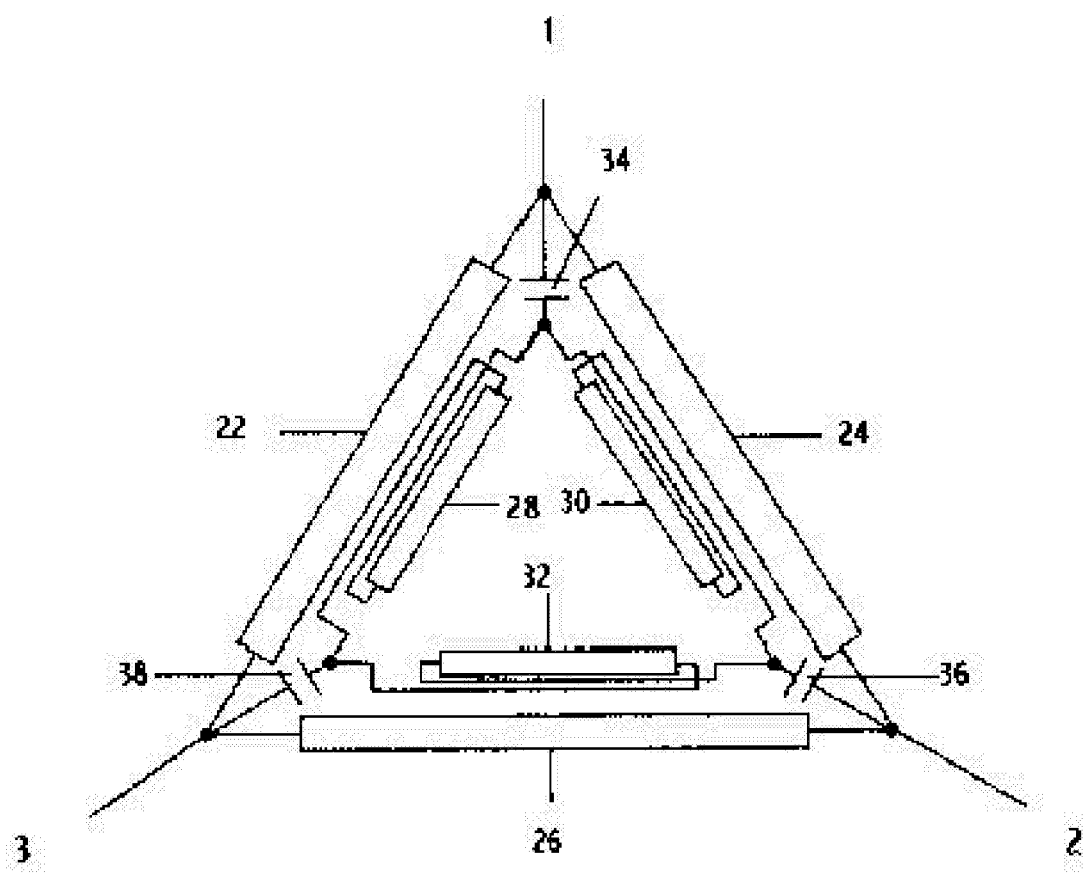
FIG. 12 is a diagrammatic representation of a delta configuration motor that incorporates the teachings of this invention.

The winding depicted in FIG. 12 has the highest efficiency of the novel windings. The main windings are denoted 22, 24, and 26 and are delta-wound. The additional windings are denoted 28, 30, 32; note their reverse connections relative to their respective main windings. The capacitors in series with the additional windings are denoted 34, 36, and 38, respectively. Both the main windings and additional windings are arranged in a delta configuration. The additional windings are physically nested within the delta-wound main windings. The highest efficiency is realized because there are no direct or hard electrical connections with the power line, i.e., the winding is fed only by the capacitors. This removes the problem associated with currents in opposition to one another, and allows a maximum de-saturation of the main winding.

Figure 13:
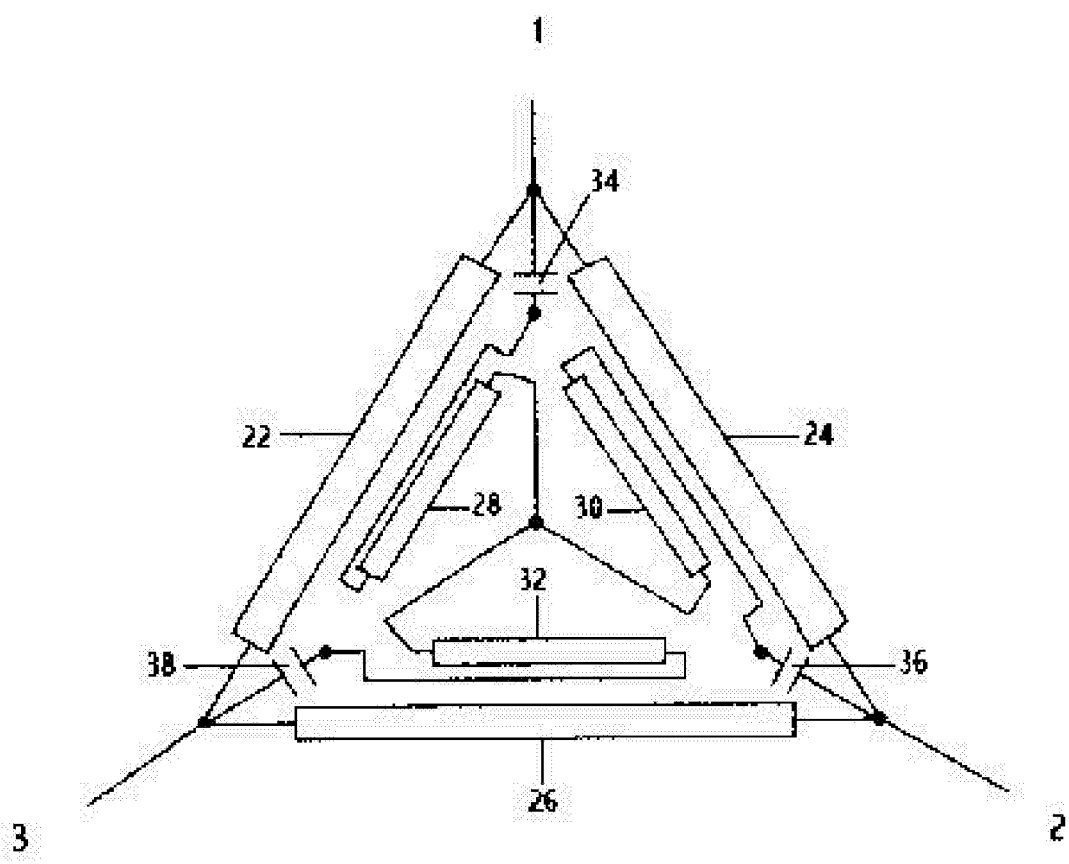
FIG. 13 is a diagrammatic representation of a delta configuration motor that incorporates the teachings of this invention.

The winding depicted In FIG. 13 has the second highest efficiency. Main windings 22, 24, and 26 are arranged in a delta configuration but the additional windings 28, 30, and 32 are wired in a star configuration, physically nested within the delta configuration of the main windings. Winding capacitors 34, 36, and 38 are respectively in series with additional windings 28, 30, and 32.

Figure 14:
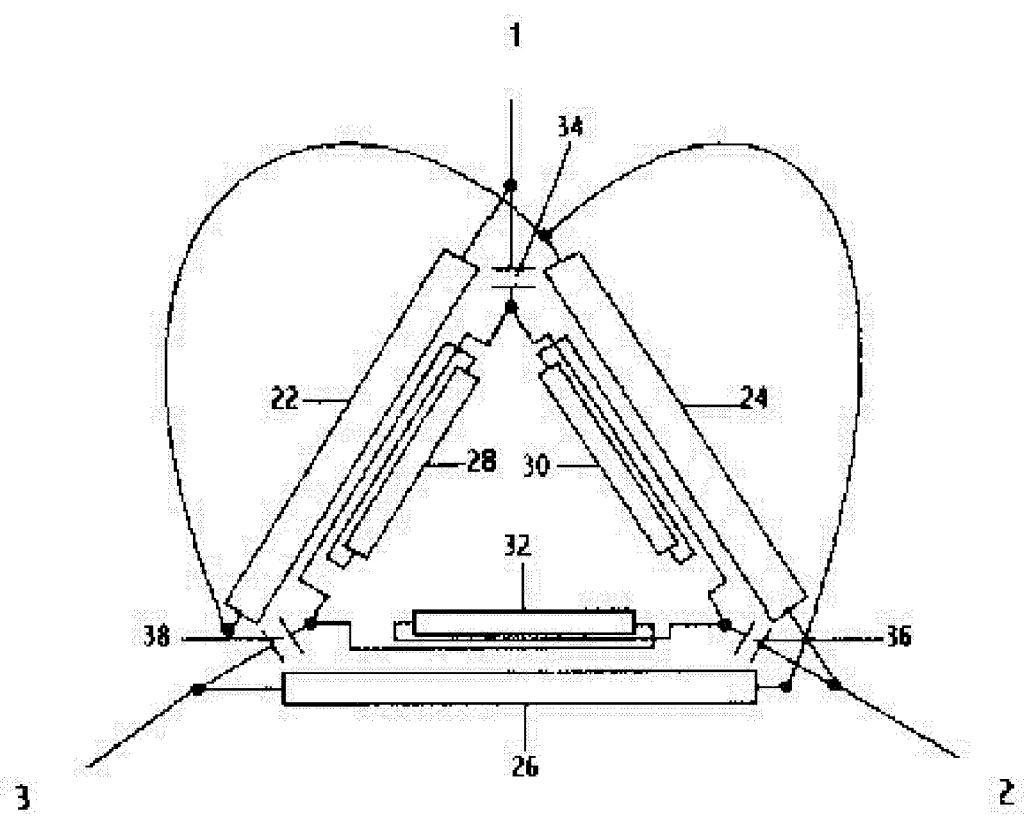
FIG. 14 is a diagrammatic representation of a star (or Y) configuration motor that incorporates the teachings of this invention.

FIG. 14 depicts a winding having the same efficiency as the winding of FIG. 13. Main windings 22, 24, and 26 are electrically connected to one another in a star configuration but they are physically nested within each respective additional winding 28, 30 and 32. Additional windings 28, 30, and 32 are electrically connected in a delta configuration and are physically nested within the star (Y) arrangement of the main windings. As in all embodiments, winding capacitors 34, 36, and 38 are in series with their respective additional windings 28, 30 and 32. Moreover, as in all embodiments, the additional windings are reversely connected relative to their respective main windings, and the additional windings and capacitors are in parallel relation to their respective main windings.

Figure 15:
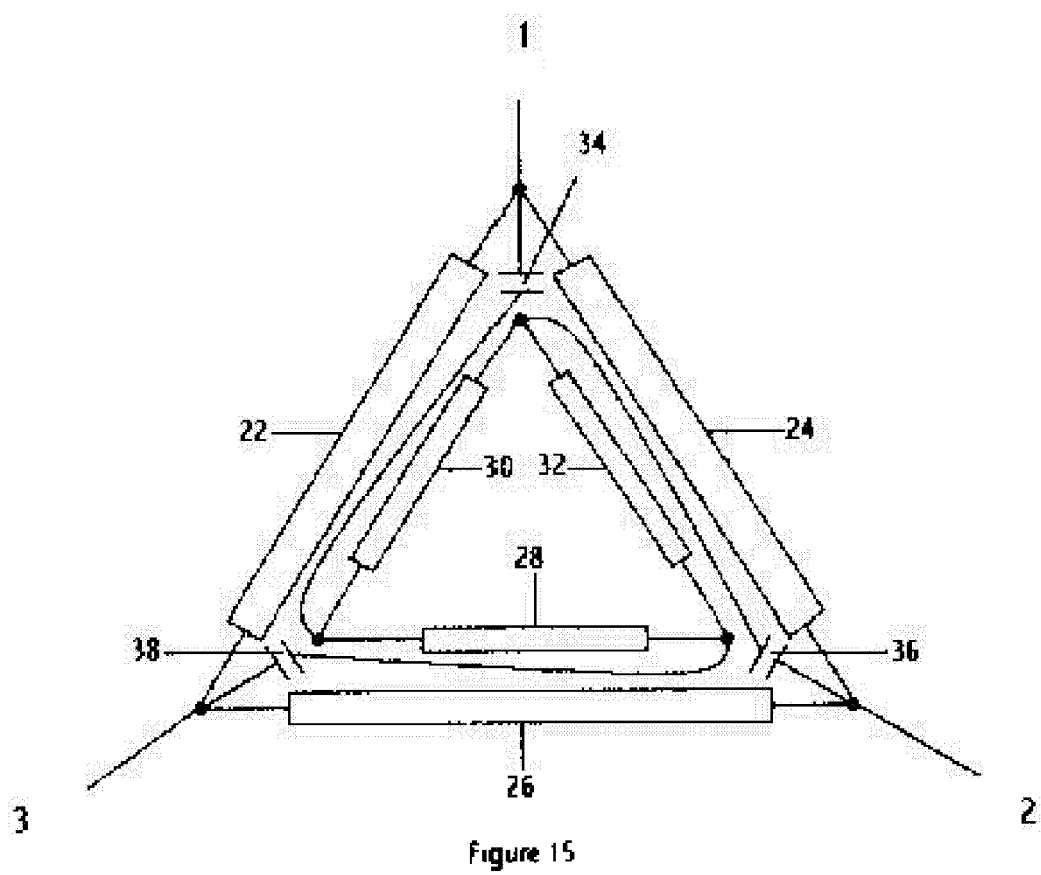
FIG. 15 is a diagrammatic representation of a delta configuration motor that incorporates the teachings of this invention.

A third best efficiency is attained by the embodiment depicted diagrammatically in FIG. 15 as well as in FIG. 9. Both the main windings 22, 24, and 26 and the additional windings 28, 30, and 32 are electrically and physically nested in a delta configuration, but in comparing FIGS. 14 and 15 it will be observed that the additional windings 28, 30, and 32 are rotated one hundred twenty degrees (120°) counterclockwise in FIG. 15 relative to their respective FIG. 14 positions. Accordingly, additional winding 30 is positioned adjacent main winding 22 in parallel, reversely connected relation thereto, additional winding 32 is positioned adjacent main winding 24 in parallel, reversely connected relation thereto, and additional winding 28 is positioned adjacent main winding 26 in parallel, reversely connected relation thereto.

Conversion of a conventional single phase or three phase electric motor to a motor that incorporates the inventive teachings achieves the following advantages: First, there are no changes of the copper density compared to a conventional motor. Secondly, separation of the conventional winding in two different and separate windings follows the approximate ratio of one-third (⅓) and two-thirds (⅔). Moreover, no changes are required on the original type of winding layout, adjacent or consequent poles.

Both windings, according to the present invention, can be wound and inserted simultaneously in only one operation in a single step.

It is feasible to calculate the value of the additional winding capacitor in microfarads per phase. This value is directly proportional to the real full load current in amperes per phase and inversely proportional of the square of the line voltage in volts. The value timing is then determined by a multiplying factor that is between approximately $0.25 \times 10^6$ and $0.3 \times 10^6$. The novel interconnections of the two windings are in opposite field directions and on different phases from each other.

The novel winding increases the overall efficiency, significantly improves the power factor, and causes a substantial drop in the starting and operating current across all loads. As an example, a conventional ten horsepower motor that draws about six (6) amps at no load draws only about six-tenths (0.6) of an amp when the additional windings and capacitors are added as disclosed herein. Under full load conditions, the same motor when would conventionally operates at a power factor of about 0.74 to 0.84 and when wound in accordance with the novel disclosure operates at a power factor of 0.99 from a twenty five percent (25%) mechanical load to full mechanical load and over.

In a single phase electric motor the first and second main windings are electrically connected at respective first ends thereof to a main common point and at respective second ends thereof to first and second potential lines of a line voltage. First and second additional windings are each electrically connected in series to a winding capacitor and the first and second potential lines in a parallel, reverse connection with the first and second main windings. Each of the first and second additional windings generates an electromagnetic field in an opposite direction to an electromagnetic field generated by its associated first and second main winding.

The first and the second main windings have a first wire size and each of the first and the second additional windings has a second wire size. The first wire size is approximately twice the second wire size.

A multi-phase electric motor includes a plurality of main windings connected in delta configuration at three line connection points having a line voltage. Each of the main winding has a first wire size. An additional winding and a winding capacitor is connected in parallel relation to each of the main windings. The additional winding has a second wire size smaller than said first wire size. The reverse connection of the additional winding relative to its associated main winding generates an electromagnetic field in a direction that is opposite to the direction of the electromagnetic field of its associated main winding.

This invention is a pioneering invention because it substantially improves the efficiency of alternating current motors or synchronous generators across the entire range of load conditions. In many cases, it enables a motor to operate at a power factor greater than 0.90 even at no load and low load conditions. Such performance cuts in half the power required to operate a motor. With approximately sixty four percent (64%) of all electrical power in the United States being consumed by AC electric motors, the savings created by the present invention are substantial. In view of the pioneering status of this invention, the claims that follow are entitled as a matter of law to broad interpretation, to protect the heart or essence of the invention from piracy.

French Patent Application Number 0207820000 filed Jun. 25, 2002, now French patent No FR 2841404, is hereby incorporated by reference into this disclosure.

It will thus be seen that the objects set forth above, and those made apparent from the foregoing description, are efficiently attained. Since certain changes may be made in the above construction without departing from the scope of the invention, it is intended that all matters contained in the foregoing description or shown in the accompanying drawings shall be interpreted as illustrative and not in a limiting sense.

It is also to be understood that the following claims are intended to cover all of the generic and specific features of the invention herein described, and all statements of the scope of the invention that, as a matter of language, might be said to fall there between.

Now that the invention has been described,

What is claimed is:

1. A single phase electric motor winding, comprising:
a main winding having a predetermined number of turns;
an additional, desaturating winding having a number of turns equal to at least about half of said predetermined number of turns of said main winding but not exceeding said predetermined number of turns of said main winding;
a capacitor electrically connected in series with said additional, desaturating winding; said capacitor and said additional, desaturating winding electrically connected in parallel with said main winding; and
said additional, desaturating winding being reversely connected relative to said main winding so tat current flows in a first direction through said main winding and in a second direction through said additional, desaturating winding, said second direction being opposite to said first direction.

2. The single phase electric motor of claim 1, further comprising;
said main winding formed of a conductor having a first predetermined cross-section and said additional, desaturating winding formed of a conductor having a second predetermined cross-section;
said first and second predetermined cross-sections being related to one another by a ratio;
said ratio being about two-thirds (⅔) to one-third (⅓).

3. A single phase electric motor, comprising:
a main winding having two half sections electrically connected to one another in series;
an additional, desaturating winding having two half sections connected to one another in series;
a capacitor connected in series to said two half sections;
said additional, desaturating winding and said capacitor connected in parallel to said main winding;
each half section of said additional, desaturating winding connected in reverse relative to an associated half section of said main winding so that current flowing through said half sections of said additional, desaturating winding flows in an opposite direction relative to current flowing through said half sections of said main winding;
each half section of said additional, desaturating winding having a number of turns equal to at least about half of said predetermined number of turns of each half section of said main winding but not exceeding said predetermined number of turns of each half section of said main winding.

4. The single phase electric motor of claim 3, further comprising:
a start winding, a start capacitor, and a switch means connected in series with one another and in parallel relation to said main and additional, desaturating windings.

5. A single phase electric motor, comprising:
a main winding having two half sections electrically connected to one another in parallel;
an additional, desaturating winding having two half sections connected to one another in series;
a capacitor connected in series to said two additional, desaturating winding half sections;
said additional, desaturating winding half sections and said capacitor connected in parallel to said main winding;
each half section of said additional, desaturating winding connected in reverse relative to an associated half section of said main winding so that current flowing through said half sections of said additional, desaturating winding flows in an opposite direction relative to current flowing through said half sections of said main winding;
each half section of said additional, desaturating winding having a number of turns equal to at least about half of said predetermined number of turns of each half section of said main winding but not exceeding said predetermined number of turns of each half section of said main winding.

6. A single phase electric motor, comprising:
a main winding having two half sections electrically connected to one another in parallel;
an additional, desaturating winding having two half sections connected to one another in parallel;
a capacitor connected in series to said two additional, desaturating winding half sections;
said additional, desaturating winding half sections and said capacitor connected in parallel to said main winding;
each half section of said additional, desaturating winding connected in reverse relative to an associated half section of said main winding so that current flowing through said half sections of said additional, desaturating winding flows in an opposite direction relative to current flowing through said half sections of said main winding;

each half section of said additional, desaturating winding having a number of turns equal to at least about half of said predetermined number of turns of each half section of said main winding but not exceeding said predetermined number of turns of each half section of said main winding.

7. A single phase electric motor, comprising:

a main winding having two half sections electrically connected to one another in series;

an additional desaturating winding having two half sections connected to one another in parallel;

a capacitor connected in series to said two additional, desaturating winding half sections;

said additional, desaturating winding half sections and said capacitor connected in parallel to said main winding;

each half section of said additional, desaturating winding connected in reverse relative to an associated half section of said main winding so that current flowing through said half sections of said additional, desaturating winding flows in an opposite direction relative to current flowing through said half sections of said main winding;

each half section of said additional, desaturating winding having a number of turns equal to at least about half of said predetermined number of turns of each half section of said main winding but not exceeding said predetermined number of turns of each half section of said main winding.

8. A delta-wound three phase motor, comprising:

a first, second, and third main winding connected to one another in delta configuration;

a first, second, and third additional, desaturating winding connected to one another in delta configuration, said first, second and third main and additional, desaturating windings being physically superposed in nested relation to one another;

said first, second, and third additional, desaturating windings respectively connected in parallel and reversely connected relation to said first, second, and third main windings so that current flowing through said first, second and third main windings flows in a first direction and current flowing through sad first, second, and third additional, desaturating windings flows in a second direction opposite to said first direction.

a first, second, and third capacitor respectively connected in series relation to said first, second, and third additional, desaturating windings so that each additional, desaturating winding is fed current at a different phase than the current fed to said first, second, and third main windings; and said first, second, and third additional, desaturating windings having a predetermined number of turns between fifty percent to one hundred percent (50%-100%) of the number of turns of their associated main windings.

9. A star-wound three phase motor, comprising:

a first, second, and third main winding connected to one another in star configuration;

a first, second, and third additional, desaturating winding connected to one another in star configuration;

said first, second and third main and additional, desaturating windings being physically superposed in nested relation to one another;

said first, second, and third additional, desaturating windings respectively connected in parallel and reversely connected relation to said first, second, and third main windings so that current flowing through said first, second and third main windings flows in a first direction and current flowing through sad first, second, and third additional, desaturating windings flows in a second direction opposite to said first direction.

a first, second, and third capacitor respectively connected in series relation to said first, second, and third additional, desaturating windings so that each additional winding is fed current at a different phase than the current fed to said first, second, and third main windings; and said first, second, and third additional, desaturating windings having a predetermined number of turns between fifty percent to one hundred percent (50%-100%) of the number of turns of the associated main windings.

10. A delta-wound three phase motor, comprising:

first, second, and third main windings electrically connected to one another in delta configuration first, second, and third additional, desaturating windings electrically and mechanically connected to one another in delta configuration;

said first, second and third main and additional, desaturating windings being physically superposed in nested relation to one another;

said first, second, and third additional desaturating windings being nested within the delta configuration of said first, second, and third main windings;

said first, second, and third additional, desaturating windings being respectively connected in parallel and reversely connected relation to said first, second, and third main windings so that current flowing through said first second and third main windings flows in a first direction and current flowing through sad first, second, and third additional, desaturating windings flows in a second direction opposite to said first direction;

a first, second, and third capacitor respectively connected in series relation to said first, second, and third additional, desaturating windings; and said first, second, and third additional, desaturating windings having a predetermined number of turns between fifty percent to one hundred percent (50%-100%) of the number of turns of their associated main windings.

11. A delta-wound three phase motor, comprising:

first, second, and third main windings electrically and mechanically connected to one another in delta configuration;

first, second, and third additional, desaturating windings electrically connected to one another in star configuration said first, second and third main and additional, desaturating windings being physically superposed in nested relation to one another;

said first, second, and third additional, desaturating windings being respectively connected in parallel and reversely connected relation to said first, second, and third main windings so that current flowing through said first, second and third main windings flows in a first direction and current flowing through said first, second, and third additional, desaturating windings flows in a second direction opposite to said first direction;

a first, second, and third capacitor respectively connected in series relation to said first, second, and third additional, desaturating windings; and said first, second, and third additional, desaturating windings having a predetermined number of turns between fifty percent to one hundred percent (50%-100%) of the number of turns of their associated main windings.

12. A star-wound three phase motor, comprising:

first, second, and third main windings electrically connected to one another in star configuration, first, second, and third additional, desaturating windings electrically connected to one another in delta configuration;

said first, second and third main and additional, desaturating windings being physically superposed in nested relation to one another;

said first, second, and third additional, desaturating windings being respectively connected in parallel and reversely connected relation to said first, second, and third main windings so that current flowing through said first, second and third main windings flows in a first direction and current flowing through sad first, second, and third additional, desaturating windings flows in a second direction opposite to said first direction;

a first, second, and third capacitor respectively connected in series relation to said first, second, and third additional, desaturating windings; and said first, second, and third additional, desaturating windings having a predetermined number of turns between fifty percent to one hundred percent (50%-100%) of the number of turns of their associated main windings.

13. A delta-wound three phase motor, comprising:

first, second, and third main windings electrically connected to one another in delta configuration;

first, second, and third additional, desaturating windings electrically connected to one another in delta configuration;

said first, second and third main and additional, desaturating windings being physically superposed in nested relation to one another;

said first, second, and third additional, desaturating windings being respectively connected in parallel and reversely connected relation to said second, third, and first main windings so that current flowing through said first, second and third main windings flows in a first direction and current flowing through said second, third, and first additional, desaturating windings flows in a second direction opposite to said first direction;

a first, second, and third capacitor respectively connected in series relation to said first, second, and third additional, desaturating windings so that each additional, desaturating winding is fed current at a different phase than the current fed to said first, second, and third main windings so that a one hundred twenty degree (120°) phase shift is achieved; and said first, second, and third additional, desaturating windings having a predetermined number of turns between fifty percent to one hundred percent (50%-100%) of the number of turns of their associated main windings.

* * * * *